United States Patent
Wu et al.

(10) Patent No.: US 11,360,811 B2
(45) Date of Patent: Jun. 14, 2022

(54) TASK PARALLEL PROCESSING METHOD, APPARATUS AND SYSTEM, STORAGE MEDIUM AND COMPUTER DEVICE

(71) Applicant: Shanghai Cambricon Information Technology Co., Ltd, Shanghai (CN)

(72) Inventors: Linyang Wu, Shanghai (CN); Qi Guo, Shanghai (CN); Xunyu Chen, Shanghai (CN); Kangyu Wang, Shanghai (CN)

(73) Assignee: SHANGHAI CAMBRICON INFORMATION TECHNOLOGY CO., LTD, Shanghai (CN)

( * ) Notice: Subject to any disclaimer, the term of this patent is extended or adjusted under 35 U.S.C. 154(b) by 187 days.

(21) Appl. No.: 16/702,491

(22) Filed: Dec. 3, 2019

(65) Prior Publication Data
US 2020/0104162 A1 Apr. 2, 2020

Related U.S. Application Data

(63) Continuation of application No. PCT/CN2018/108298, filed on Sep. 28, 2018.

(30) Foreign Application Priority Data

Nov. 20, 2017 (CN) .......................... 201711157341.X
Dec. 29, 2017 (CN) .......................... 201711484410.8
(Continued)

(51) Int. Cl.
*G06F 9/38* (2018.01)
*G06F 9/48* (2006.01)
(Continued)

(52) U.S. Cl.
CPC .............. *G06F 9/4881* (2013.01); *G06F 9/38* (2013.01); *G06F 9/4856* (2013.01); *G06F 9/54* (2013.01);
(Continued)

(58) Field of Classification Search
CPC ........ G06F 9/4881; G06F 9/38; G06F 9/4856; G06F 9/54; G06F 9/547; G06N 3/04; G06N 3/10
See application file for complete search history.

(56) References Cited

U.S. PATENT DOCUMENTS 6,243,696 B1 * 6/2001 Keeler ................. G06N 3/0472
706/21
10,586,052 B1 * 3/2020 Marelas ................ G06F 21/577
(Continued)

FOREIGN PATENT DOCUMENTS

CN 102012844 A 4/2011
CN 104239137 A 12/2014
(Continued)

OTHER PUBLICATIONS

First Office action issued in related Chinese Application No. 201711484410.8, dated Oct. 28, 2019, 6 pages.
(Continued)

*Primary Examiner* — Emerson C Puente
*Assistant Examiner* — Jonathan R Labud
(74) *Attorney, Agent, or Firm* — Bayes PLLC

(57) ABSTRACT

Computer systems, data processing methods, and computer-readable media are provided to run original networks. An exemplary computer system includes first and second processors a memory storing offline models and corresponding input data of a plurality of original networks, and a runtime system configured to run on the first processor. The runtime system, when runs on the first processor, causes the first processor to implement a plurality of virtual devices comprising a data processing device configured to obtain an offline model and corresponding input data of an original network from the memory, an equipment management device configured to control turning on or off of the second processor, and a task execution device configured to control
(Continued)

the second processor to run the offline model of the original network.

13 Claims, 8 Drawing Sheets

(30) Foreign Application Priority Data

Jan. 29, 2018 (CN) .......................... 201810083577.1
Jan. 29, 2018 (CN) .......................... 201810084077.X

(51) Int. Cl.
 *G06F 9/54* (2006.01)
 *G06N 3/04* (2006.01)
 *G06N 3/10* (2006.01)
(52) U.S. Cl.
 CPC ............... *G06F 9/547* (2013.01); *G06N 3/04* (2013.01); *G06N 3/10* (2013.01)

(56) References Cited

U.S. PATENT DOCUMENTS

| | | | |
|---|---|---|---|
| 2003/0055798 A1* | 3/2003 | Hittle | G05B 11/42 706/15 |
| 2015/0074675 A1 | 3/2015 | Qi et al. | |
| 2015/0242741 A1* | 8/2015 | Campos | G06N 3/10 706/25 |
| 2016/0103677 A1 | 4/2016 | Melski | |
| 2016/0155048 A1* | 6/2016 | McCormick | G06N 3/04 706/27 |
| 2017/0124454 A1 | 5/2017 | Vasudevan et al. | |
| 2017/0147943 A1* | 5/2017 | Boehm | G06F 8/433 |
| 2017/0262479 A1* | 9/2017 | Chester | G06F 16/583 |
| 2018/0056123 A1* | 3/2018 | Narasimha Rao | A63B 24/0062 |
| 2018/0174009 A1* | 6/2018 | Schleef | G06K 19/0723 |

FOREIGN PATENT DOCUMENTS

| | | |
|---|---|---|
| CN | 106156810 A | 11/2016 |
| CN | 107103113 A | 8/2017 |
| CN | 107341127 A | 11/2017 |
| JP | H09171503 A | 6/1997 |
| JP | 2016536692 A | 11/2016 |
| WO | 2016057887 A1 | 4/2016 |
| WO | 2017163442 A1 | 9/2017 |

OTHER PUBLICATIONS

Extended European search report in related European Application No. 19210491.7, dated Apr. 9, 2020, 10 pages.
Extended European search report issued in related European Application No. 18878728.7, dated Sep. 23, 2020, 11 pages.
Matt Welsh et al: "SEDA: An Architecture for Well-Conditioned, Scalable Internet Services", Operating Systems Review, ACM, New York, NY, US, vol. 35, No. 5, Oct. 21, 2001, pp. 230-243, XP058184710, 14 pages.
First Office Action issued in related Chinese Application No. 20171157341.X, dated Jun. 29, 2020, 9 pages.
Office Action issued in related Japanese Application No. 2019-568198, dated Mar. 2, 2021, 2 pages.
International Search Report and Written Opinion in corresponding International Application No. PCT/CN2018/108298, dated Dec. 29, 2018, 6 pages.
First Office action issued in related Chinese Application No. 201810084077.X, dated Oct. 21, 2019, 7 pages.
First Office action issued in related Chinese Application No. 201810083577.1, dated Oct. 22, 2019, 10 pages.
Office Action issued in related Japanese Application No. 2019-568198 dated Sep. 21, 2021, 2 pages.
Midonnet, Serge et al., A processor workload distribution algorithm for massively parallel applications, Proceedings of 2016 International Symposium on Computer Architecture and High Performance Computing Worksho ps, US, IEEE, Oct. 26, pp. 25-30, https://ieeexplore.ieee.org/document/7803671.
Office Action in corresponding European Application No. 18878728.7 dated Apr. 5, 2022 (14 pages).

\* cited by examiner

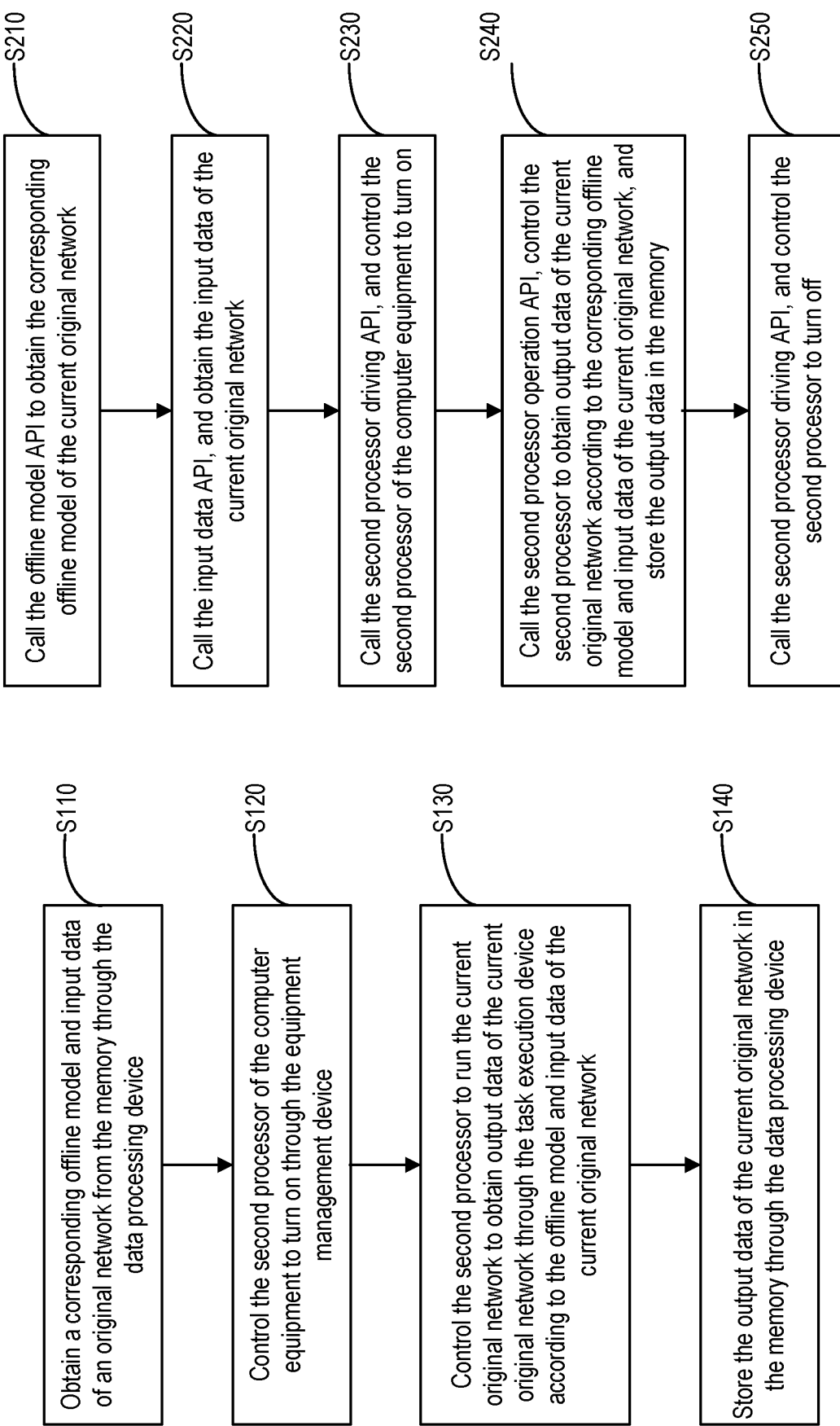

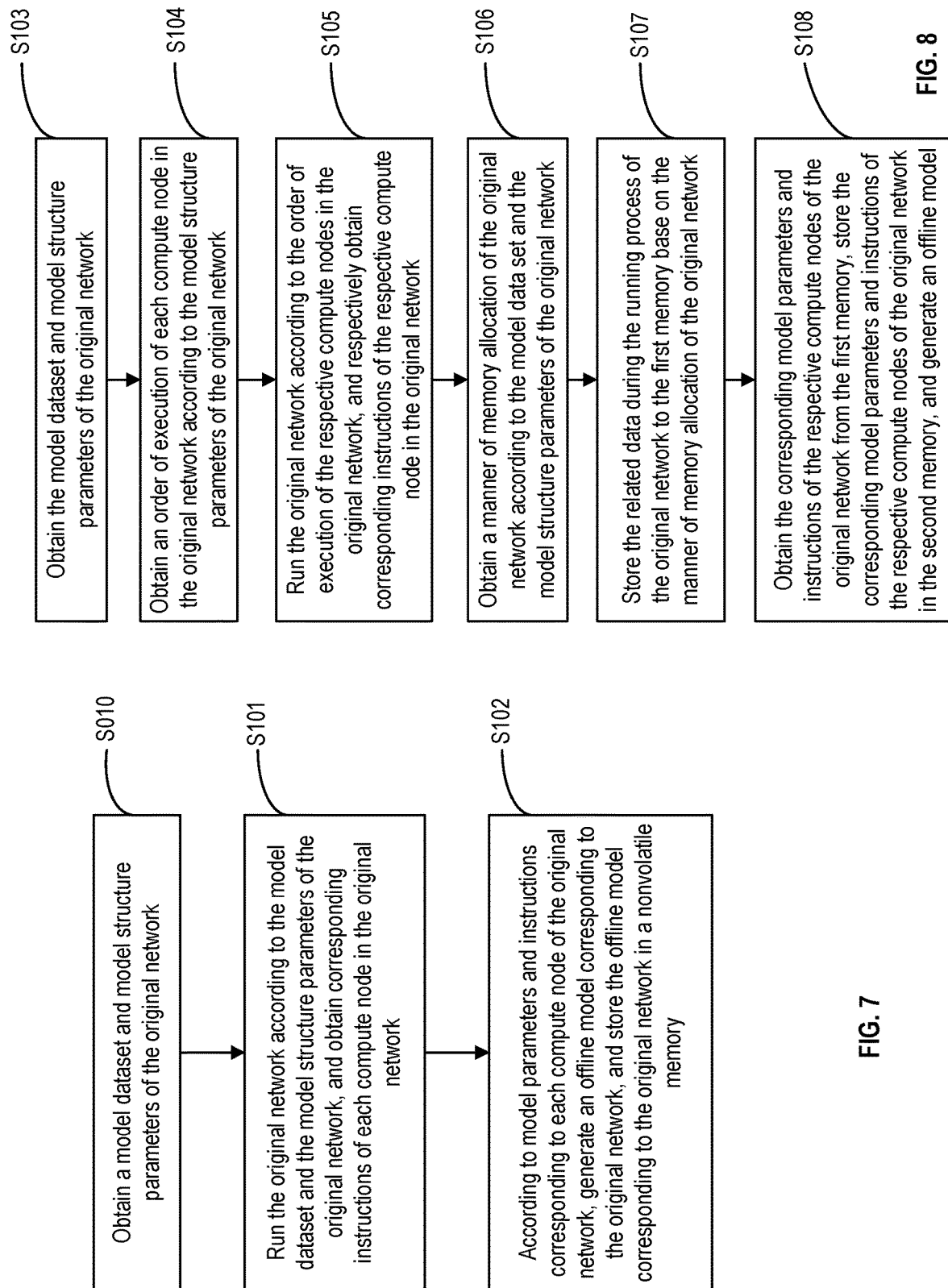

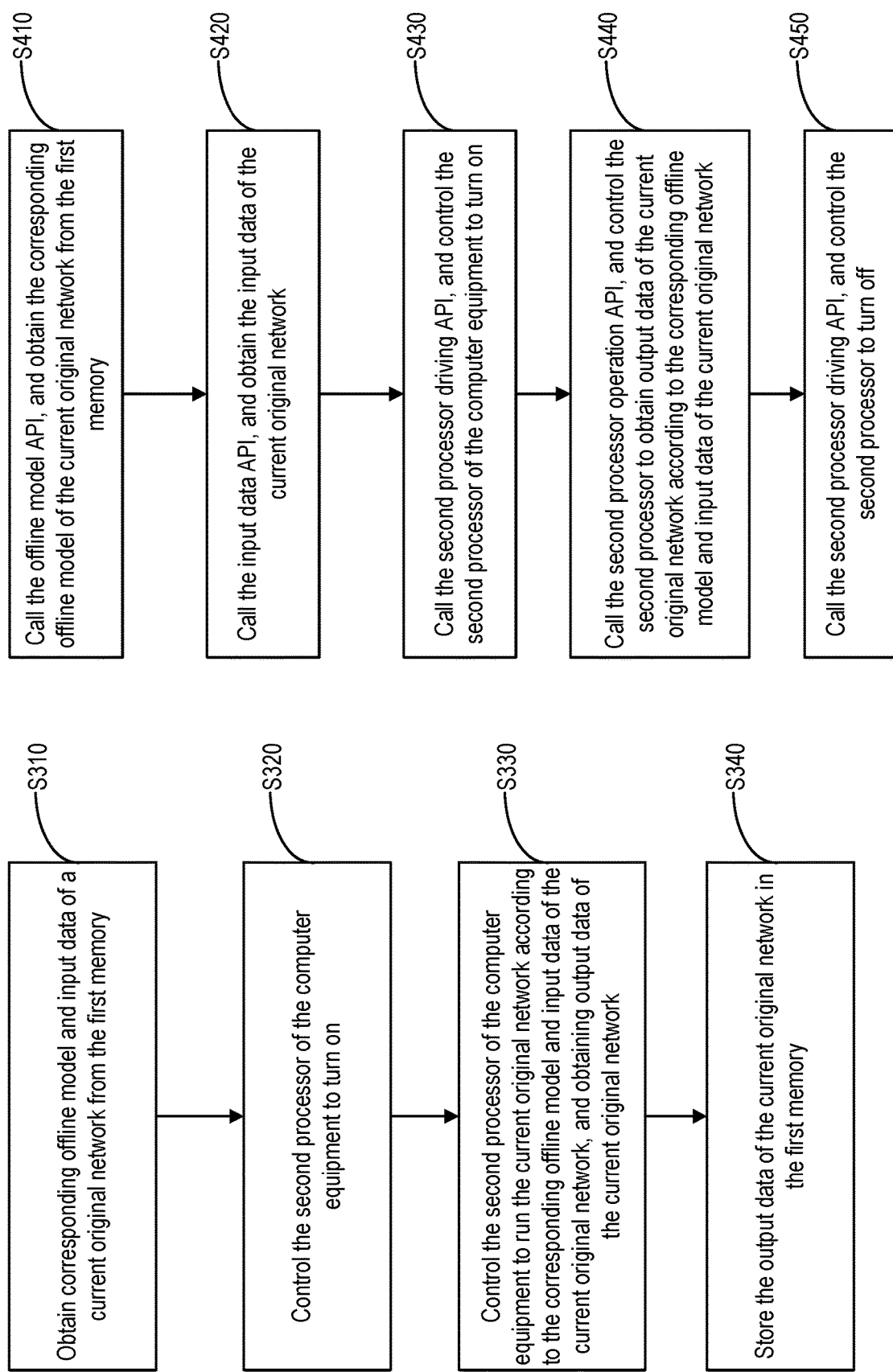

TASK PARALLEL PROCESSING METHOD, APPARATUS AND SYSTEM, STORAGE MEDIUM AND COMPUTER DEVICE

The present application is a continuation of International Application No. PCT/CN2018/108298, filed Sep. 28, 2018, which claims the benefits of priority to: Chinese Patent Application No. 201711157341.X with the title of "Task Parallel Processing Method. Storage Medium, Computer Equipment, Device, and System" filled on Nov. 20, 2017; Chinese Patent Application No. 201711484410.8 with the title of "Instruction List Scheduling Method, Device, Computer Equipment, and Storage Medium" filled on Dec. 29, 2017; Chinese Patent Application No. 201810084077.X with the title of "Computer Equipment, Data Processing Method, and Storage Medium" filled on Jan. 29, 2018; and Chinese Patent Application No. 201810083577.1 with the title of "Computer Equipment, Data Processing Method, and Storage Medium" filled on Jan. 29, 2018. The entire contents of each of the above-identified applications are expressly incorporated herein by reference.

TECHNICAL FIELD

The present disclosure relates to the field of computer technology, and in particular relates to a computer equipment, data processing method, and storage medium.

BACKGROUND

An artificial neural network, which is a type of heavyweight data, is formed by a large number of interconnecting nodes (or can be referred to as neurons). The traditional computer equipment may read a neural network directly, execute the respective computation nodes of the neural network in sequence according to the structure of the neural network by following a certain manner, and obtain a computation result of the neural network. In other words, the traditional computer equipment may process the data of the heavyweight neural network directly, which may affect data processing speed and efficiency of the computer equipment. Besides, due to the feature of the artificial neural network, the artificial neural network may fail to run in some operating systems that can only process lightweight data, which may limit the application scope of the neural network.

SUMMARY

Embodiments of the present application improve the operation efficiency of neural network computation, broaden the usability of neural network data, and overcome the low efficiency drawback of conventional computer equipment that run a heavyweight neural network directly.

In one example, a computer system is provided. The computer system includes first and second processors. The computer system also includes a memory storing offline models and corresponding input data of a plurality of original networks, and a runtime system configured to run on the first processor. The runtime system, when runs on the first processor, causes the first processor to implement a plurality of virtual devices. The plurality of virtual devices include a data processing device configured to obtain an offline model and corresponding input data of an original network from the memory. The offline model of the original network includes model parameters, instructions, and interface data of respective computation nodes of the original network. The plurality of virtual devices also include an equipment management device configured to control turning on or off of the second processor. The plurality of virtual devices further include a task execution device configured to control the second processor to run the offline model of the original network.

In another example, a data processing method is provided. The data processing method is implemented by first and second processors. The data processing method includes obtaining, by the first processor, an offline model and corresponding input data of an original network from a memory. The offline model of the original network includes model parameters, instructions, and interface data of respective computation nodes of the original network. The data processing method also includes controlling, by the first processor, the second processor to turn on or off. The data processing method also includes running, on the second processor, the original network based on the offline model and the corresponding input data of the original network obtained by the first processor to obtain output data of the original network. The data processing method further includes storing the output data of the original network in the memory.

In a further example, a computer-readable storage medium storing a computer program is provided. The computer program, when executed by one or more processors, causes the one or more processors to perform operations. The operations include obtaining, by a first processor, an offline model and corresponding input data of an original network from a memory. The offline model of the original network includes model parameters, instructions, and interface data of respective computation nodes of the original network. The operations also include controlling, by the first processor, a second processor to turn on or off. The operations further include controlling the second processor to run the original network based on the offline model and the corresponding input data of the original network obtained by the first processor to obtain output data of the original network. In addition, the operations include storing the output data of the original network in the memory.

Embodiments of the present disclosure may directly obtain offline model and corresponding input data of an original network from the memory. The second processor may be able to run the original network based on the obtained offline model and the corresponding input data of the original network to obtain output data. Because the offline model of each original network may merely include corresponding model parameters, instructions, and interface data of respective computation nodes of the original network, the amount of data of the offline model may be far lighter than that of the original network. Therefore, by running the corresponding offline model (lightweight) of the original network on the computer system, the processing of heavyweight neural network data may be realized. Meanwhile, by directly running the offline model of the original network on the second processor, processing operations such as compiling on the respective computation nodes of the original network may not be necessary, thereby improving the processing speed and efficiency.

BRIEF DESCRIPTION OF THE DRAWINGS

FIG. 5 is a flowchart showing a data processing method of an example of the computer equipment in FIG. 1;

FIG. 6 is a flowchart showing a data processing method of another example of the computer equipment in FIG. 1;

FIG. 7 is a flowchart showing a method for generating an offline model in an example of the present disclosure;

FIG. 8 is a flowchart showing a method for generating an offline model in another example of the present disclosure;

FIG. 12 is a flowchart showing a data processing method of an example of the computer equipment in FIG. 11; and FIG. 13 is a flowchart showing a data processing method of another example of the computer equipment in FIG. 11.

DETAILED DESCRIPTION OF THE EXAMPLES

In order to make the purposes, technical schemes, and technical effects of the present disclosure clearer, examples of the present disclosure will be described hereinafter with reference to the accompanied drawings. It should be understood that the examples described herein are merely for explaining the present disclosure, rather than limiting the present disclosure. It should be noted that, provided that there is no contradiction, the examples of the present disclosure and features of the examples can be combined with each other. It should be understood that the terms such as "first", "second" and the like used in the examples of the present disclosure are for distinguishing between different objects rather than describing any particular order or technical meaning.

Figure 9:
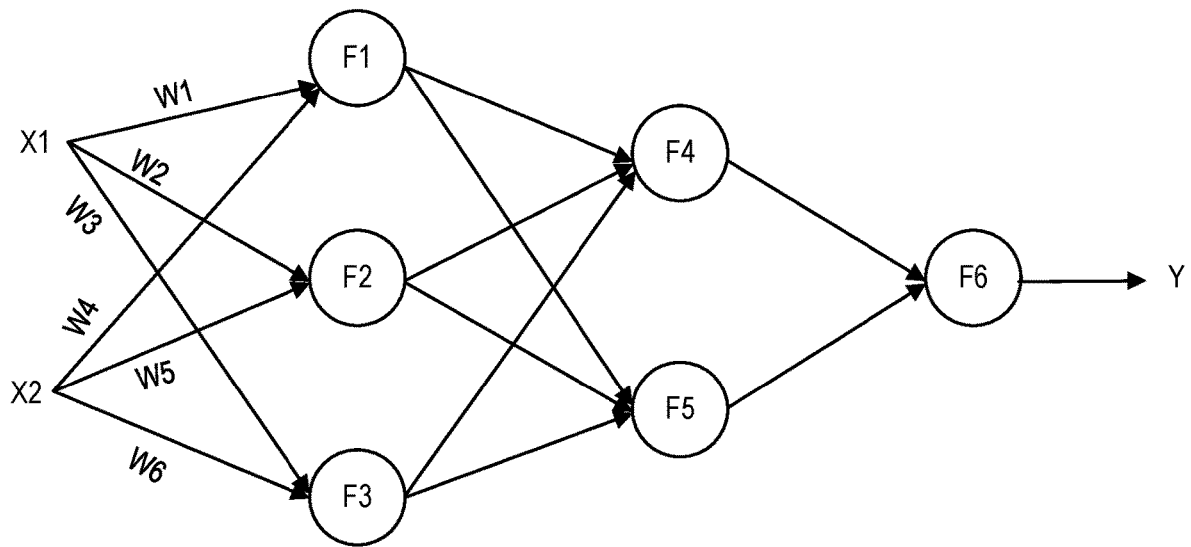
FIG. 9 is a network structural diagram of a neural network of an example.

An example of the disclosure provides an offline model generation method. The offline model generation method can run on a cloud server or a dedicated neural network processor, and store an obtained offline model of an original network on a memory 130. The cloud server or the dedicated neural network processor may be a processor that can process heavyweight data such as a neural network. The cloud server or the dedicated neural network processor may not be included in the above-mentioned computer equipment. Specifically, as shown in FIG. 7, the method above may further include:

S010, obtaining a model dataset and model structure parameters of an original network, specifically, the model dataset and the model structure parameters of the original network may be obtained by an obtaining unit of the cloud server or the dedicated neural network processor, and a network structure graph of the original network may be obtained through the model dataset and the model structure parameters of the original network. The model dataset may include data such as corresponding model parameters of each compute node of the original network. W1 to W6 in a neural network shown in FIG. 9 are used to represent model parameters of computation nodes. The model structure parameters may include connections among a plurality of computation nodes of the original network, and computation attributes of the respective computation nodes, where the connections among the computation nodes may be used to indicate whether data is transferred among the computation nodes. For instance, when there is a transfer of data stream among a plurality of computation nodes, connections exists among the plurality of computation nodes. Further, the connections of computation nodes may include an input relation and an output relation. As shown in FIG. 9, if output of compute node F1 is used as input of compute node F4 and compute node F5, then compute node F1 may have a connection relation with compute node F4, and compute node F1 may have a connection relation with compute node F5. For another instance, there is no transfer of data between compute node F1 and compute node F2, which may indicate that F1 has no connection with compute node F2.

The attributes of the respective computation nodes may include an computation type and computation parameters of corresponding computation nodes, where the computation type of a compute node may refer to a type of computation that the compute node completes, e.g., the computation type of the compute node may include addition, subtraction, convolution operations, etc., correspondingly, the compute node may be a compute node for realizing addition, a compute node for realizing subtraction, or a compute node for realizing convolution operations, etc. Computation parameters of a compute node may be necessary parameters for completing a type of computation corresponding to the compute node. For instance, the type of computation corresponding to the compute node may be a compute node for realizing addition, correspondingly, the computation parameters of the compute node may be addends for addition, and augends for the addition may be used as input data and be obtained through the obtaining unit, or the augends for the addition may be output data of a previous compute node of the compute node, etc.

Alternatively, the original network may be an artificial neural network that is based on a deep learning system such as TensorFlow, MXNet, Caffe, and PyTorch, and is built for a generic processor such as CPU, GPU, or DSP. The original network may further be an artificial neural network that is built for an intelligent processor such as IPU. For instance, when the original network is a neural network based on Caffe, a model dataset (caffemodel) and model structure parameters (prototxt) of the Caffe network may be obtained. The model dataset (caffemodel) may include data such as model parameters of the Caffe network, and the model structure parameters (prototxt) may include a computation attribute of each compute node of the Caffe network, connections among a plurality of computation nodes, etc.

S101, running the original network according to the model dataset and the model structure parameters of the original network, and obtaining corresponding instructions of each compute node in the original network. Specifically, a computation unit of the cloud server or the dedicated neural network processor may run the original network according to the model dataset and the model structure parameters of the original network, and obtain corresponding instructions of each compute node in the original network. Further, the obtaining unit of the cloud server or the dedicated neural network processor may obtain input data of the original network. The computation unit of the cloud server or the dedicated neural network processor may run the original network according to the input data, the network model dataset and the model structure parameter of the original network, and obtain corresponding instructions of each compute node in the original network. Still further, the above-mentioned process of running the original network to obtain instructions of each computation is in fact a process of compiling. The process of compiling may be realized by the cloud server or the dedicated neural network processor or a virtual device. In other words, the cloud server or the dedicated neural network processor or the virtual device may run the original network according to the model dataset and the model structure parameters of the original network. The virtual device refers to processor running space virtualized in memory space of a memory.

It should be understood that the running the original network of the present example refers to that the cloud server or the dedicated neural network processor may use artificial neural network model data to run a machine learning algorithm and realize a target application (e.g., artificial intelligence applications such as speech recognition) by performing a forward computation.

S102, according to model parameters and instructions corresponding to each compute node of the original network, generating an offline model corresponding to the original network, and storing the offline model corresponding to the original network in a nonvolatile memory. Specifically, a controlling unit of the cloud server or the dedicated neural network processor can generate the offline model corresponding to the original network according to the model parameters and instructions corresponding to the respective computation nodes of the original network, for instance, the controlling unit of the cloud server or the dedicated neural network processor can store the model parameters and instructions corresponding to the respective compute node of the original network on a nonvolatile second memory for generating and storing the offline model. For the respective computation nodes of the original network, the model parameters and instructions of the computation nodes may be stored in a manner of one-to-one correspondence. By doing so, when running the original network again, the offline model corresponding to the original network can be obtained from the nonvolatile memory directly, and the original network can run according to the corresponding offline model. Since there is no need to perform online compiling for each compute node of the original network to obtain instructions, the running speed and efficiency of a system may be improved.

It should be understood that in the present example, directly running the corresponding offline model of the current original network refers to using the offline model to run a corresponding machine learning algorithm (e.g., neural network algorithm) of the original network, and realize a target application (e.g., artificial intelligence applications such as speech recognition) by performing forward operation.

Specifically, as shown in FIG. 8, the above-mentioned S102 may further include:

S104, obtaining an order of execution of each compute node in the original network according to the model structure parameters of the original network, Specifically, the computation unit of the cloud server or the dedicated neural network processor may obtain the order of execution of each compute node in the original network according to the model structure parameters of the original network, and further, the computation unit of the cloud server or the dedicated neural network processor may obtain the order of execution of each compute node in the original network according to the connections among the respective computation nodes in the original network. For instance, as shown in FIG. 9. Input data of compute node F4 is input data of compute node F1 and output data of compute node F2, and input data of compute node F6 is input data of compute node F4 and output data of compute node F5. Then, the order of execution of the respective computation nodes in the neural network as shown in FIG. 9 may be F1-F2-F3-F4-F5-F6, or F1-F3-F2-F5-F4-F6, etc. Of course, computation nodes F1, F2, and F3 may be executed in parallel, and computation nodes F4 and F5 may also be executed in parallel. Instances are given here merely for the purpose of explanation, and are not considered to be the limit of the order of execution.

S105, running the original network according to the order of execution of the respective computation nodes in the original network, and respectively obtaining corresponding instructions of the respective compute node in the original network. Specifically, the computation unit of the cloud server or the dedicated neural network processor may run the original network according to the order of execution of the respective computation nodes in the original network, so as to obtain the corresponding instructions of the respective computation nodes in the original network. In other words, the cloud server or the dedicated neural network processor may compile data such as the module dataset of the original network to obtain the corresponding instructions of the respective computation nodes. According to the corresponding instructions of the respective computation nodes, the computation function realized by a compute node may be known. In other words, computation attributes such as the type of computation and computation parameters of the compute node may be known.

Further, as shown in FIG. 8, the above-mentioned S103 may further include:

S106, obtaining a manner of memory allocation of the original network according to the model data set and the model structure parameters of the original network. Specifically, the computation unit of the cloud server or the dedicated neural network processor may obtain the manner of memory allocation of the original network according to the model dataset and the model structure parameters of the original network. Further, the cloud server or the dedicated neural network processor may obtain the order of execution of the respective computation nodes in the original network according to the model structure parameters of the original network, and determine the manner of memory allocation of the original network according to the order of execution of the respective computation nodes in the original network. For instance, related data during running process of the respective computation nodes may be stored in a stack according to the order of execution of the respective computation nodes. The manner of memory allocation refers to determining a storage location of the related data (including input data, output data, model parameters, and intermediate results) of the respective computation nodes in the original network in memory space (e.g., the first memory). For instance, a data table may be used to store mappings of related data of the respective computation nodes (input data, output data, model parameters and intermediate results and etc.) and memory space.

S107, according to the manner of memory allocation of the original network, storing the related data during the running process of the original network to the first memory, where the related data during the running process of the original network may include corresponding model parameters, instructions, input data, intermediate computation results, and output data etc., of the respective computation nodes of the original network. For instance, as shown in FIG. 9, X1 and X2 represent input data of the neural network, Y represent output data of the neural network. The cloud server or the dedicated neural network processor may convert the output data of the neural network to controlling commands for robots or different digital interfaces. W1 to W6 are used to represent corresponding model parameters of computation nodes F1, F2, and F3, and output data of computation nodes F1 to F5 may be used as intermediate computation results. According the confirmed manner of memory allocation, the cloud server or the dedicated neural network processor may store the related data during the running process of the original network to the first memory, such as a nonvolatile storage medium including an internal memory or a cache, for the specific manner of storage, see the storage memory in the left half of FIG. 10.

Figure 10:
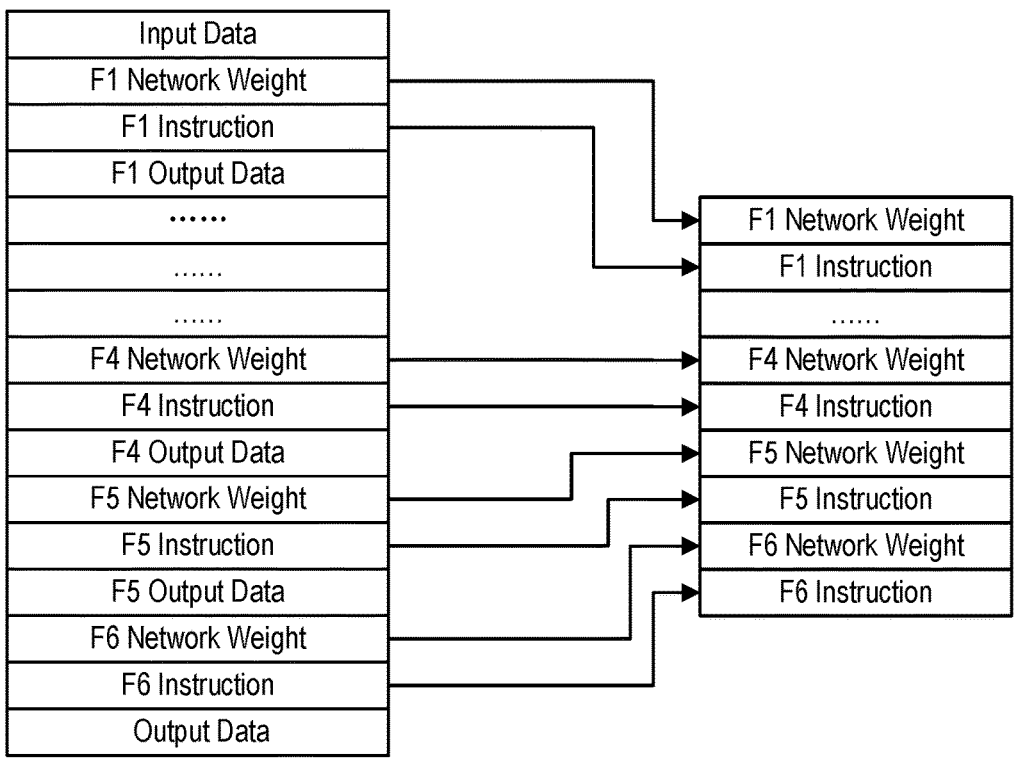
FIG. 10 is a diagram showing a generation process of an offline model of the neural network in FIG. 9.

S108, obtaining the corresponding model parameters and instructions of the respective computation nodes of the original network from the first memory, and storing the corresponding model parameters and instructions of the respective computation nodes of the original network in the second memory and generating an offline model. The second memory may be a nonvolatile memory such as an external memory. FIG. 10 shows a generating process of the offline model, memory space in the right half of FIG. 10 stores the corresponding offline model of the original network.

The above-mentioned generating process of the offline model will be described below with reference to the accompanied drawings FIG. 9 and FIG. 10.

First, the cloud server or the dedicated neural network processor may obtain the model dataset, the model structure parameters, and input data of the original network, so as to obtain a network structure graph of the original network according to the model dataset and model structure parameters of the original network, which is as shown in FIG. 10.

Then, the cloud server or the dedicated neural network processor may obtain the connections of the respective computation nodes in the original network according to the model structure parameters of the original network, and according to the connections the respective computation nodes, obtain the order of execution of the respective computation nodes in the original network and the manner of memory allocation during the running process of original network, so as to obtain a storage location of the related data during the running process of the original network. As shown in the left half of FIG. 10, the related data during the running process of the original network may be stored in a stack according to the order of execution of the respective computation nodes.

Finally, the cloud server or the dedicated neural network processor may store the corresponding model parameters and instructions of the respective computation nodes of the original network in the nonvolatile second memory and generate an offline model. The storage manner of the offline model can be seen in the storage memory shown in the right half of FIG. 10. Besides, the offline model may only include data such as required model parameters and instructions for running the original network. Input data, output data, or intermediate results during the running process of the original network may not be stored, so that consumption of memory space of the second memory may be reduced.

In the traditional technology, an artificial neural network, which is a type of heavyweight data, is formed by a large number of nodes (or may be referred to as neurons) connecting to each other. A traditional computer equipment may read a neural network directly, and execute the respective computation nodes of the neural network in sequence according to the structure of the neural network by following a certain manner, and obtain a computation result of the neural network. In other words, the traditional computer equipment may process the data of the heavyweight neural network directly, which may affect data processing speed and efficiency of the computer equipment. Besides, based on the feature of the artificial neural network, the artificial neural network may not be able to run in some operating systems that can only process lightweight data, which may limit the application scope of the neural network.

Figure 1:
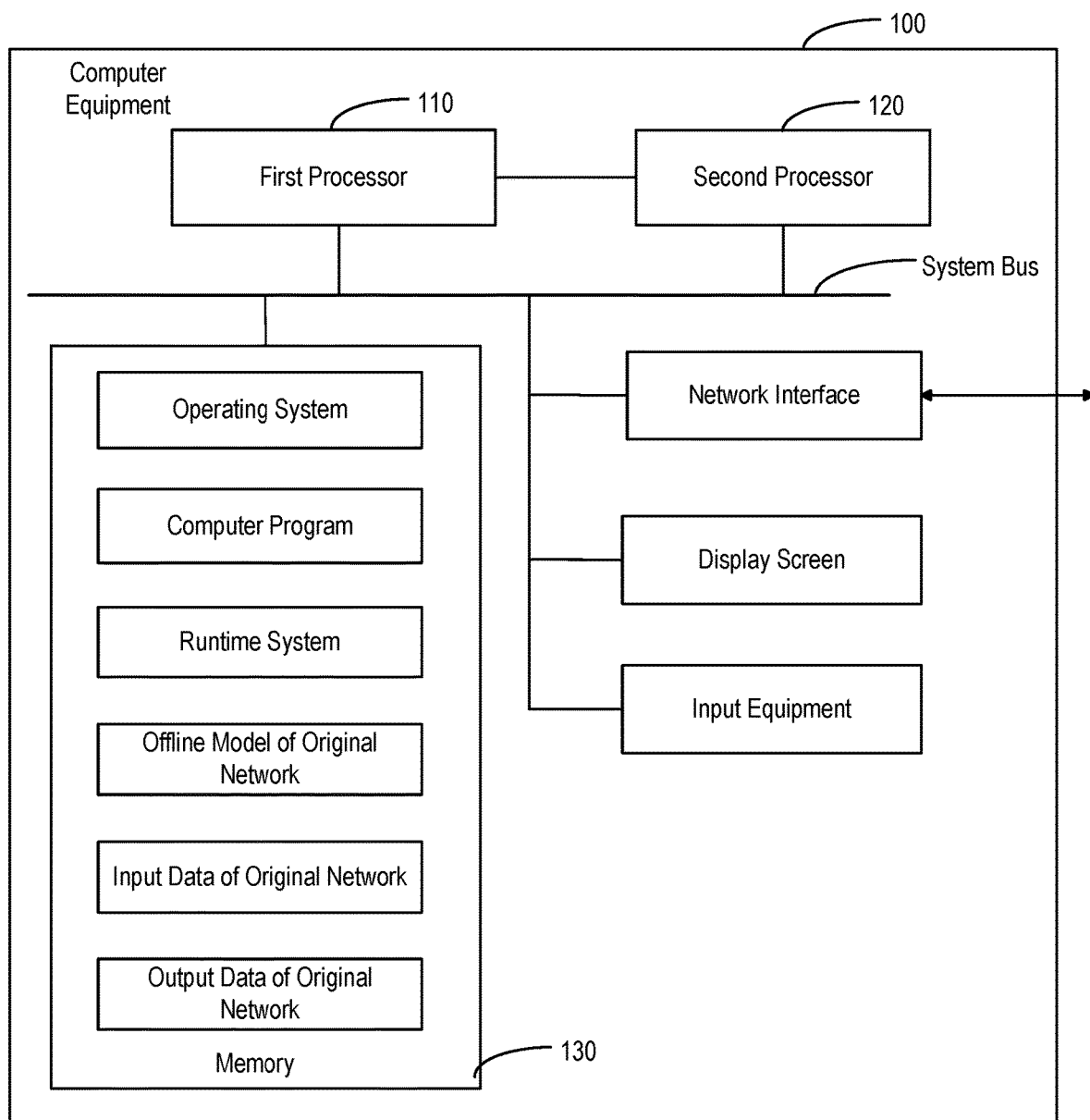
FIG. 1 is a block diagram of a computer equipment in an example of the present disclosure.
Figure 2:
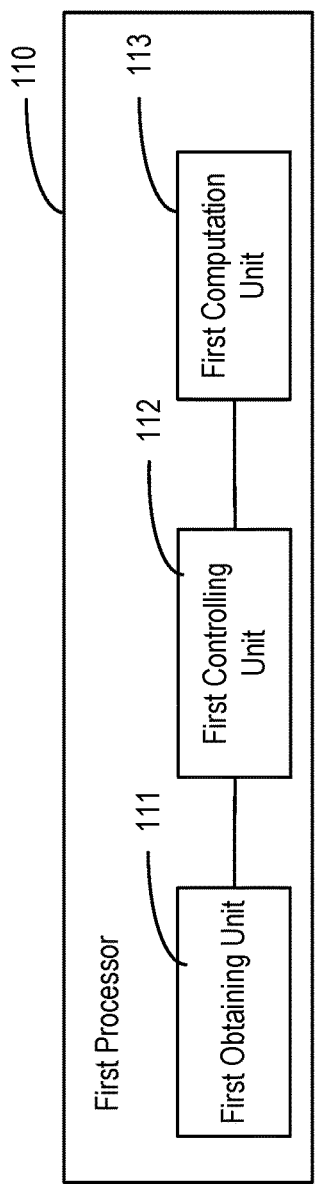
FIG. 2 is a block diagram of an example of the first processor in FIG. 1.

As shown in FIG. 1, an example of the present disclosure provides a computer equipment. The computer equipment 100 may include a hardware system and a software system, where the hardware system may include a first processor 110, a second processor 120, and a memory 130. As shown in FIG. 2, the first processor 110 may be configured to provide computation and controlling capabilities, the first processor 110 may include a first obtaining unit 111, a first computation unit 113, a first controlling unit 112, etc. The first obtaining unit 111 may be a hardware unit such as an IO (input/output) interface. The first computation unit 113 and the first controlling unit 112 may both be hardware units. For instance, the first computation unit 113 and the first controlling unit 112 may be digital circuits, analog circuits, or the like. Physical implementation of the hardware circuits may include, but is not limited to, a physical device, and the physical device may include, but is not limited to, a transistor, a memristor, and the like. The second processor 120 may also be configured to provide computation and controlling capabilities. The second processor 120 may include a second obtaining unit, a second computation unit, a second controlling unit, and the like. The second obtaining unit may be a hardware unit such as an IO interface. The second computation unit and the second controlling unit may both be hardware units. The connections and formation of each structure of the second processor 120 may be the same as the connections and formation of each structure of the first processor. For the specific detail, see the description in the preceding part. Alternatively, the first processor or the second processor may be a general processor such as CPU (Central Processing Unit), GPU (Graphics Processing Unit), and DSP (Digital Signal Processing), or a dedicated neural network processor such as IPU (Intelligence Processing Unit).

As shown in FIG. 1, the memory 130 may be configured to store corresponding offline models and input data of a plurality of original networks and a software system of the computer equipment. The software system of the computer equipment may include software that can run on the first processor 110 or the second processor 120. The software may include an operating system, a computer program, an application software, a runtime system 131, and the like. Further, the memory 130 may be configured to store output data of each original network (in other words, computation results of each original network). Yet further, the memory 130 may include a first storing unit configured to store offline models, a second storing unit configured to store input data, a third storing unit configured to store output data, and a fourth storing unit configured to store a runtime system. Alternatively, a count of the memory 130 may be two or greater than two. For instance, the count of the memory 130 may be two, the two memories are marked as a first memory and a second memory, where the first memory may be configured to store corresponding offline model and input data of an original network, and the second memory may be configured to store a runtime system. Alternatively, the memory 130 may be a nonvolatile memory such as ROM (Read Only Memory), PROM (Programmable ROM), EPROM (Electrically PROM), EEPROM (Electrically Erasable PROM), or flash memory.

It should be understood that, the runtime refers to a condition that a program is running (or being executed), and the runtime indicates which program is running during a certain period. The runtime system refers to a virtual machine of process level, which is used to represent an operating system of application. Specifically, the runtime system may be a software system built through computer software, the software system may run on a processor such as CPU (Central Processing Unit), GPU (Graphics Processing Unit), DSP (Digital Signal Processing), or IPU (Intelligence Processing Unit), so that a data processing function may be realized. The runtime system of the present example of the disclosure is different from an operating system of a computer equipment. The software system of a computer equipment may include the above-mentioned runtime system and operating system at the same time.

Figure 3:
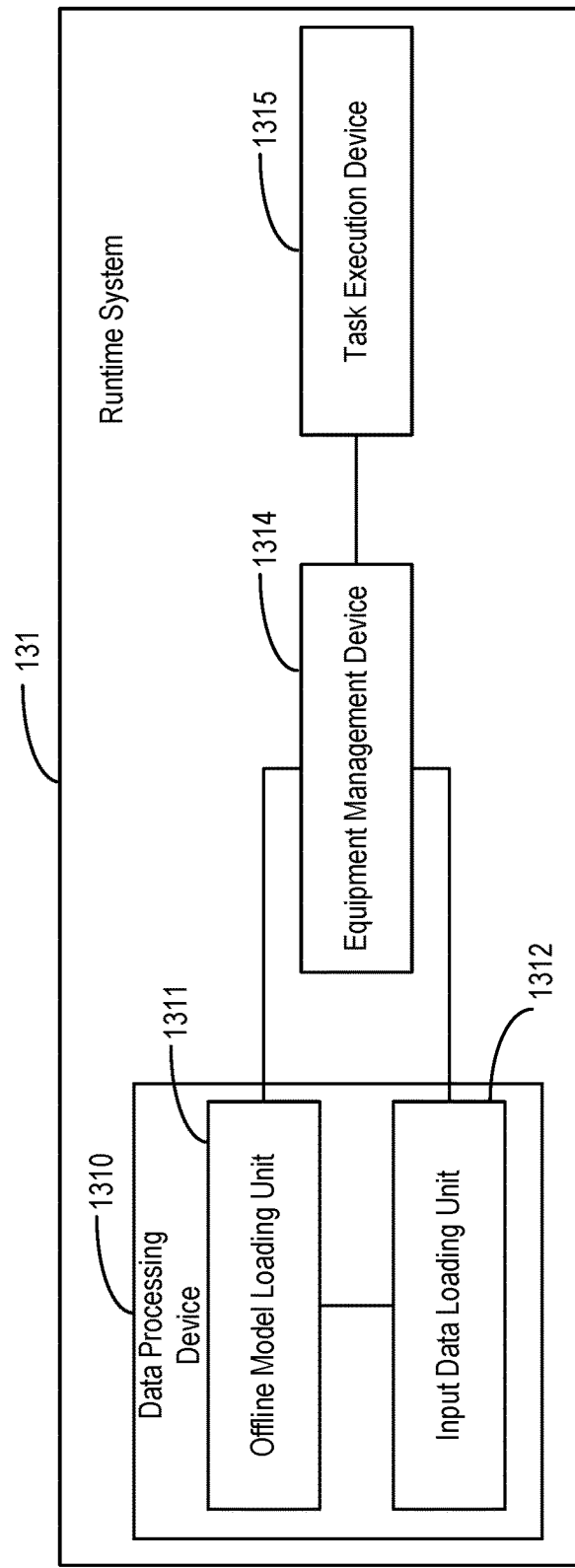
FIG. 3 is a block diagram of an example of the runtime system in FIG. 1.

As shown in FIG. 3, the runtime system 131 in the example of the present disclosure may be capable of running on the first processor 110, the runtime system 131 may include a data processing device 1310, an equipment management device 1314, and a task execution device 1315. The data processing device 1310 and the equipment management device 1314 may both be connected to the task execution device 1315. Specifically, when the first processor 110 run the runtime system 131, the runtime system 131 may be capable of controlling the second processor 120 to run heavyweight data such as a neural network, in other words, the runtime system 131 may be capable of controlling the second processor 120 to perform computation according to offline model and input data of the neural network, so as to obtain output data of the neural network. The data processing device 1310 may be configured to obtain the corresponding offline model and input data of the original network from the memory 130. The offline model of the current original network and the input data of the current network may be configured correspondingly. Alternatively, the corresponding offline model of the current original network may include necessary network structure information such as the corresponding model parameter and instruction of each compute node of the original network as well as interface data of each compute node of the original network. The offline model of the current original network does not include relevant data such as intermediate computation results, input data, and output data of each compute node in the current original network, thus, when data of the offline model of the current original network is far lighter than data of the current original network, the offline model of the current original network can be considered as lightweight data.

Specifically, the corresponding instructions of the respective computation nodes may indicate computation functions realized by the computation nodes, where the instructions may specifically include computation attributes of the respective computation nodes of the original network. The node interface data of the current original network may be configured to indicate connections among computation nodes of the current original network. Specifically, the node interface data of the current original network may include a source of input data and a source of output data of the respective computation nodes. For instance, as shown in FIG. 9, X1 and X2 are corresponding input data of a current original network, Y is corresponding output data of the current original network, and W1 to W6 are corresponding model parameters of computation nodes F1 to F3 in the current original network. The node interface data of the current original network may include computation nodes F1, F2, and F3, which are initial computation nodes, inputs of those computation nodes are preset input data. Input data of compute node F1 is used as input data of computation nodes F4 and F5, and the like. By doing so, when running the original network again, merely by obtaining the offline model and input data of the current original network, the running process of the current original network may be realized by running the corresponding offline model of the current original network.

The equipment management device 1314 may be configured to be a driving device of the second processor 120, and may be configured to control the second processor 120 to turn on or turn off. When the second processor 120 turns off, the second processor 120 does not execute any task; when the second processor 120 turns up, the second processor 120 may execute tasks such as computation or controlling. In the example of the present disclosure, the second processor 120 may be a neural network accelerator which may be configured to execute the offline model of the current original network. The task execution device 1315 may be configured to control the second processor 120 to run the offline model and input data obtained by the data processing device 1310, so as to obtain output data of the current original network (in other words, a computation result of the neural network). It should be understood that running the corresponding offline model of the current original network refers to using the offline model to run a corresponding machine learning algorithm (e.g., neural network algorithm) of the original network, and realizing a target application (e.g., artificial intelligence applications such as speech recognition) by performing forward operation.

Specifically, when the computer equipment 100 is required to run heavyweight data such as a neural network, the first processor 110 may run the runtime system 131, so that through the runtime system 131, the second processor 120 may be controlled to run data including the neural network. In other words, when the computer equipment 100 is required to run heavyweight data such as a neural network, first, the data processing device 1310 may obtain the corresponding offline model and input data of the current original network from the memory 130. After loading the corresponding offline model and input data of the current original network, the equipment management device 1314 may control the second processor 120 to turn on. Then, the task execution device 1315 may control the second processor 120 to run the offline model and input data of the current original network, so as to realize the running process of the current original network and obtain a computation result of the current original network.

In the example of the present disclosure, the offline model of the current original network may merely store necessary network structure information such as corresponding model parameters and instructions of the respective computation nodes of the original network, as well as interface data of the respective computation nodes of the original network. Thus, data of the offline model of the original network may be far lighter than data of the current original network, so that by running the offline model of the current original network, a computer equipment may be able to realize the processing of heavyweight data such as a neural network, and the application scope of a neural network can be expanded. Meanwhile, by directly running the corresponding offline model of the current original network on the computer equipment, there is no need to perform processing operation such as compiling on each compute node of the current original network, so that the processing speed and efficiency of the computer equipment can be increased.

Alternatively, as shown in FIG. 3, the data processing device 1310 may include an offline model loading unit 1311 and an input data loading unit 1312. The offline model loading unit 1311 may be configured to obtain the offline model of a current original network from the memory 130, and parse the obtained offline model of the current original network, so as to obtain corresponding model parameters and instructions of respective computation nodes of the original network as well as interface data of the respective computation nodes of the original network. Further, the process of parsing the offline model of the current original network by the offline model loading unit 1311 may further include a process of performing data preprocessing (e.g., data format conversion and normalization) on the offline model of the current original network, so that the second processor 120 may be able to run the offline model of the current original network.

The input data loading unit 1312 may be configured to obtain input data from the memory 130. The input data may be corresponding input data of initial computation nodes of the original network. As shown in FIG. 9, X1 and X2 are input data of initial computation nodes of an original network. Further, the input data may be obtained through an application software and be stored in the memory 130. The application software may run on the first processor or the second processor. For instance, users may set input data of the current original network through an interactive interface of the application software, and the runtime system may store the obtained input data of the current original network in the memory 130.

In the example of the present disclosure, the offline model loading unit 1311 may further be configured to obtain a loading progress of offline model in real time, and the input data loading unit 1312 may further be configured to obtain loading progress of input data in real time. For instance, when the offline model loading unit 1311 finishes loading the offline model of the current original network (e.g., a data loading percentage of the offline model is 100%), and after the input data loading unit 1312 finishes loading the input data of the current original network (e.g., a loading percentage of input data is 100%), the offline model loading unit 1311 and the input data loading unit 1312 may send a signal indicating the completion of data loading to the equipment management device 1314, so that the equipment management device 1314 may control the second processor 120 to turn on according to the signal indicating the completion of data loading. After the second processor 120 turns on, the equipment management device 1314 may send a signal indicating the completion of turning up to the task execution device 1315, then the task execution device 1315 may control the second processor 120 to run the offline model of the current original network according to the received signal indicating the completion of starting up.

In other examples, the second processor may be controlled to turn on in advance, so that the data processing speed and efficiency of the computer equipment may be further increased. Besides, data of the offline model is greater than data of the input data, and the time needed for loading the offline model may be longer than the time needed for loading the input data. Thus, if the data loading percentage of the offline model loading unit 1311 is greater than or equal to a first preset percentage (e.g., 80%), a signal indicating the completion of loading may be sent to the equipment management device 1314 to turn on the second processor 120 in advance. Further, if the data loading percentage of the offline model loading unit 1311 is greater than or equal to the first preset percentage (e.g., 80%), and the data loading percentage of the input data loading unit 1312 is greater than or equal to a second preset percentage (e.g., 80%), then the offline model loading unit 1311 and the input data loading unit 1312 may send a signal indicating the completion of data loading to the equipment management device 1314, so that the equipment management device 1314 may control the second processor 120 to turn on according to the received signal indicating the completion of data loading.

Figure 4:
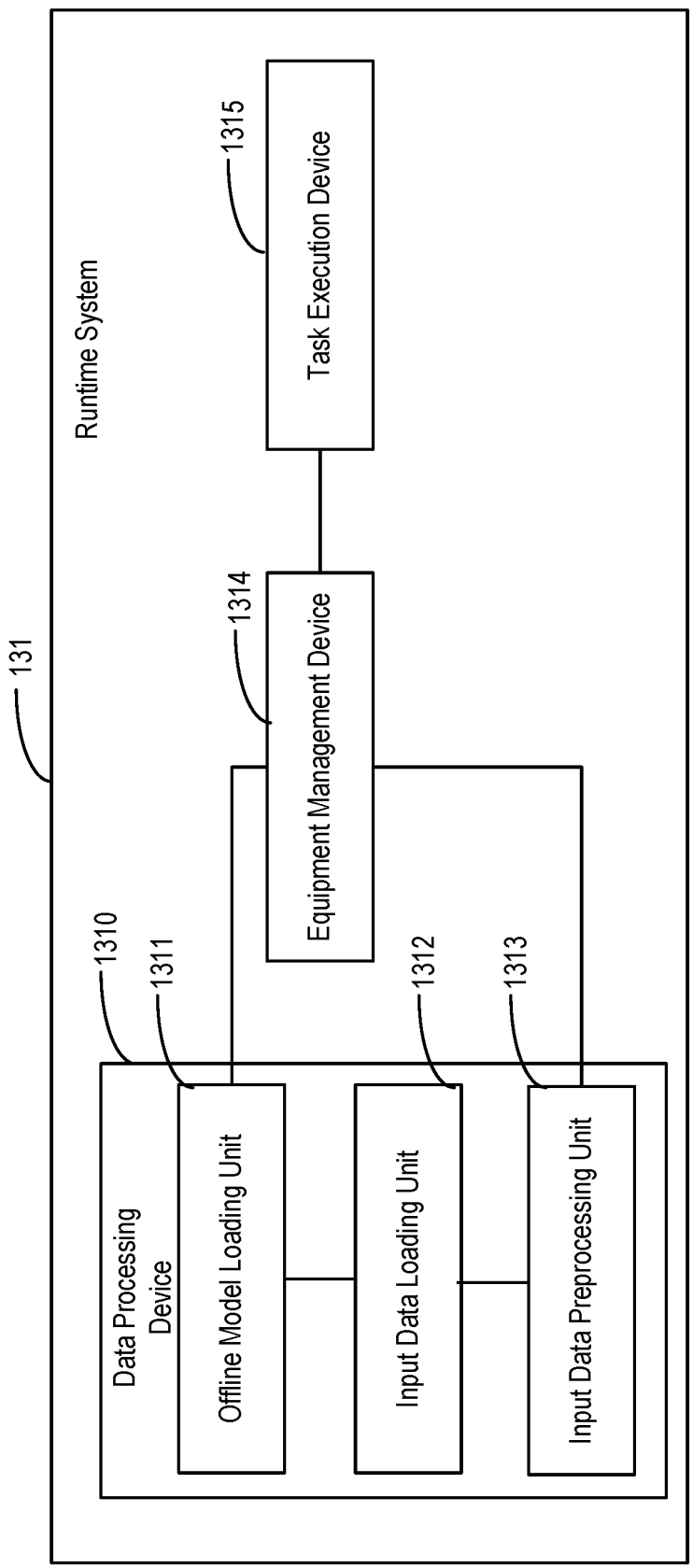
FIG. 4 is a block diagram of another example of the runtime system in FIG. 1.

Alternatively, as shown in FIG. 4, the data processing device 1310 may further include an input data preprocessing unit 1313. The input data preprocessing unit 1313 may be configured to preprocess (e.g., data format conversion and normalization) input data, so that the second processor 120 may be able to run input data. At this point, after the input data loading unit 1312 finishes loading input data, the input data loading unit 1312 may send a signal indicating the completion of input data loading to the input data preprocessing unit 1313, and the input data preprocessing unit 1313 may preprocess the corresponding input data of the current original network according to the received signal indicating the completion of input data loading, where the preprocessing may include normalization and format conversion. The equipment management device 1314 may control the second processor 120 to turn on according to the signal indicating the completion of offline model loading sent by the offline model loading unit 1311, as well as the signal indicating the completion of preprocessing sent by the input data preprocessing unit 1313.

At the same time, the input data preprocessing unit 1313 may be further configured to store output data obtained by the second processor 120 to the memory 130, specifically, after the second processor 120 finishes the execution of the offline model and input data of the current original network, the second processor 120 may transfer output data (in other words, a computation result) of the current original network to the input data preprocessing unit 1313, the input data preprocessing unit 1313 may preprocess the output data of the current original network, and then store the output data of the current original network in the memory 130, where the preprocessing may include normalization and format conversion.

In one example, the software system of the computer equipment 100 may further include application software and operating system (e.g., the Android operating system, the Microsoft operating system, and the Linux operating system). The application software can run on the operating system or the above-mentioned runtime system, and the operating system and the above-mentioned runtime system may provide an executable environment for various application software. Specifically, the operating system and application software may further be stored in the memory 130, and the operating system can run on the first processor 110 or the second processor 120.

Each device of the runtime system 131 may provide a secure API (Application Programming Interface) that can be called by the application software, so that the application software can obtain the offline model and input data of the current original network through the runtime system 131, and control the second processor 120 to run the offline model of the current original network, obtain the output data of the current original network. Specifically, the data processing device 1310 can provide an offline model API and an input data API, and further, the offline model loading unit 1311 can provide the offline model API, and the input data loading unit 1312 can provide the input data API. When heavyweight data such as a neural network is to be run, the application software may call the offline model API of the data processing device 1310, so that the offline model loading unit 1311 can obtain the corresponding offline model of the current original network from the memory 130. After loading the corresponding offline model of the current original network, the application software may call the input data API of the data processing device 1310, so that the input data loading unit 1312 can obtain the corresponding input data of the current original network from the memory 130. Further, the input data of the current original network may be obtained through the application software. For instance, users may manually set corresponding input data of the current original network through the interactive display interface of the application software. Of course, in other examples, the application software may call the above-mentioned offline model API and input data API simultaneously, so that the offline model and input data of the current original network may be loaded at the same time. The instance is given here merely for the purpose of explanation, and are not to be considered as limitation of the order of execution.

Further, the input data preprocessing unit 1313 of the data processing device 1310 may provide a data preprocessing API. After finishing loading the input data of the current original network, the application software may call the data preprocessing API, so that the input data preprocessing unit 1313 can preprocess the input data of the current original network, and the second processor can run the input data of the current original network.

The equipment management device 1314 can provide a second processor driving API. The task execution device 1315 can provide a second processor operation API. After loading the offline model and input data of the current original network, the application software can turn on the second processor 120 by calling the second processor driving API provided by the task execution device 1315. After the second processor 120 turns on, the application software can call the second processor operation API provided by the task execution device 1315, and control the second processor 120 to execute the corresponding offline model and input data of the current original network, and obtain the output data of the current original network. After finishing executing the offline model of the current original network, the application software can turn off the second processor 120 by calling the second processor driving API.

Still further, after finishing executing the offline model of the current original network, the application software may further call the data preprocessing API, so that input data preprocessing unit 1313 can preprocess the output data of the current original network, and store the output data of the current original network in the memory 130.

Furthermore, a count of the second processor 120 may be plural, the task execution device 1315 may further provide a task distribution API, and the task execution device 1315 may be configured to control the plurality of second processors 120 to realize task distribution and scheduling between the plurality of second processors 120. Specifically, the application software may select a target second processor to execute a current task from the plurality of second processors 120 by calling the task distribution API provided by the task execution device 1315. After loading the offline model and input data of the current original network, the application software can turn on the target second processor by calling the corresponding second processor driving API of the target second processor. After the target second processor turns on, the application software can call the corresponding second processor operation API of the target second processor provided by the task execution device 1315, and control the target second processor to execute the corresponding offline model and input data of the current original network. After the execution of the offline model of the current original network finishes, by calling the corresponding second processor driving API of the target second processor, the target second processor may be turned off.

Alternatively, in other examples, the second processor 120 may be a multi-core processor. In other words, the second processor 120 may include a plurality of processing units. The task execution device 1315 may be configured to control the plurality of processing units of the plurality of second processor 120, so as to realize task distribution and scheduling between the plurality of processing units of the plurality of second processors 120. Specifically, the application software may select a target processing unit to execute a current task from the plurality of processing units of the second processor 120 by calling the task distribution API provided by the task execution device 1315. After loading the offline model and input data of the current original network, the application software can turn on the target processing unit by calling the corresponding second processor driving API of the target processing unit. After the target processing unit turns on, the application software can call the corresponding second processor operation API of the target processing unit, and control the target processing unit to run the corresponding offline model and input data of the current original network. After finishing executing the offline model of the current original network, by calling the corresponding second processor driving API of the target processing unit, the target processing unit may be turned off.

As a further improvement, the runtime system 131 may be a secure runtime system built on a trusted operating environment. For instance, the runtime system 131 may be a runtime system built on TEE (Trusted Execution Environment). Specifically, TEE can build a runtime system that is separated from an insecure software system such as an operating system, so as to realize software isolation and ensure the security of offline model, input data, and output data of an original network. The application software above may be a secure application including TA. The secure application software including TA can run on a runtime system built on TEE.

The memory space of the memory 130 can be divided into secure memory space and insecure memory space. Specifically, the memory space for storing the offline model and input data of the current original network may be secure memory space, the memory space for storing the operating system, the application software, and other software systems may be insecure memory space, and the runtime system may be stored in the secure memory space or insecure memory space of the memory. Of course, the memory 130 may also be a secure memory. In this case, the runtime system. TA, and the secure memory space form a complete TEE operating environment.

In other examples, a count of the memory 130 may be more than 2, where one memory 130 may be configured to be secure memory space for storing the offline model and input data of the current original network, and one memory 130 may be configured to be insecure memory space for storing the operating system, the application software, and other software systems. Still further, the operating system, the application software, and the like may be stored in the secure memory space.

It should be understood that, the secure memory space in the example of the present disclosure refers to trusted memory space, the secure memory space may be encrypted memory space which can be encrypted by using a symmetric encryption algorithm, an asymmetric encryption algorithm, or a random encryption algorithm (e.g., using a random password generator to obtain a password). Of course, the secure memory space may also be memory space encrypted with fingerprint and the like. The above-mentioned secure runtime system 131 and the application software may also be obtained by using an encryption algorithm. Or, the secure memory space mentioned above may also be secure memory space obtained by using a credibility measurement method, and the secure runtime system 131 above and the application software may also be obtained by using a credibility measurement method.

Of course, the first processor 110 may be a secure chip, such as TPM (Trusted Platform Module), TCM (Trusted Cryptography Module), or TPCM (Trusted Platform Control Module). Further, the second processor 120 may also be a secure chip such as TPM, TCM, or TPCM.

Alternatively, the computer equipment in the example of the present disclosure may only include a processor and a memory, where the processor may be a multi-core processor. Specifically, the processor may include a plurality of processing units. For instance, the processor may include a first processing unit and a second processing unit, where the runtime system may run on the first processing unit. Further, the runtime system may include a data processing device, an equipment management device, a task execution device, and the like, where the data processing device may be configured to obtain the corresponding offline model and input data of the current original network from the memory, the corresponding offline model of the current original network may include the corresponding model parameters and instructions of respective computation nodes of the original network as well as interface data of the respective computation nodes of the original network. The equipment management device may be configured to control the second processing unit to turn on or turn off, and the task execution device may be configured to control the second processing unit to run the offline model and input data of the current original network. Furthermore, other structures of the runtime system may be similar to the structure of the runtime system mentioned in the example above, specific details can be seen in the description in the preceding part.

As shown in FIG. 5, an example of the present disclosure further provides a data processing method to be used in the computer equipment shown in FIG. 1, the data processing speed and efficiency of the computer equipment may be further increased by processing heavyweight data such as a neural network through an offline model. Specifically, the method above may include:

S110, controlling the data processing device to obtain a corresponding offline model and input data of a current original network from the memory, where the corresponding offline model of the current original network may include corresponding model parameters and instructions of respective computation nodes of the original network. Specifically, when the first processor 110 runs the runtime system 131, the first processor 110 may obtain the corresponding offline model and input data of the current original network from the memory through the data processing device 1310 of the runtime system 131. Further, the corresponding offline model of the current original network can obtained from the memory 130 through the offline model loading unit 1311 of the data processing device 1310. The input data may be obtained from the memory 130 through the input data loading unit 1312, where the input data may be corresponding input data of initial computation nodes of the original network.

S120, controlling the second processor of the computer equipment to turn on through the equipment management device. Specifically, the second processor may be controlled to turn on or turn off through the equipment management device 1314 of the runtime system 131. In other words, when the offline model loading unit 1311 finishes loading the offline model of the current original network, and after the input data loading unit 1312 finishes loading the input data of the current original network, the offline model loading unit 1311 and the input data loading unit 1312 may send a signal indicating the completion of data loading to the equipment management device 1314, so that the equipment management device 1314 may control the second processor 120 to turn on according to the received signal indicating the completion of data loading.

S130, controlling the second processor of the computer equipment to run the current original network through the task execution device according to the corresponding offline model and input data of the current original network, and obtaining output data of the current original network. Specifically, the second processor 120 may be controlled to run the offline model of the current original network through the task execution device 1315 of the runtime system 131. It should be understood that running the corresponding offline model of the current original network refers to using the offline model to run a corresponding machine learning algorithm (e.g., neural network algorithm) of the original network, and realize a target application (e.g., artificial intelligence applications such as speech recognition) by performing forward operation.

S140, storing the output data of the current original network in the memory through the data processing device. Specifically, the output data of the current original network may be stored in the memory 130 through the data processing device 1310. Further, the data processing device 1310 can preprocess the output data of the original network, where the preprocessing may include data format conversion. Then, the data processing device 1310 may store the output data in the memory 130. Alternatively, the input data preprocessing unit 1313 of the data processing device 1310 can preprocess the output data of the original network, where the preprocessing may include data format conversion. Then, the data processing device 1310 may store the output data in the memory 130.

Alternatively, after finishing loading the corresponding offline model and input data of the current original network, the obtained offline model and input data may be preprocessed so that the second processor may be able to execute the obtained offline model and input data. Specifically, S110 may further include:

S111, parsing the obtained offline model of the current original network to obtain the corresponding model parameters and instructions of the respective computation nodes of the original network as well as interface data of the respective computation nodes of the original network. Further, in specific, the obtained offline model of the current original network may be parsed through the offline model loading unit 1311, so as to obtain corresponding model parameters and instructions of the respective computation nodes of the original network as well as interface data of the respective computation nodes of the original network. Even further, the parsed data may be preprocessed through the offline model loading unit 1311, where the preprocessing may include data format conversion, normalization, and the like.

S112, preprocessing the obtained input data of the current original network, for instance, performing a preprocessing operation including data format conversion and normalization on the input data. Specifically, the input data may be preprocessed (e.g., data format conversion and normalization) through the input data preprocessing unit 1313, so that the second processor 120 may be able to run input data.

Further, the method above may also include:

obtaining a loading progress of the corresponding offline model of the current original network in real time; specifically, the offline model loading unit 1311 may obtain the loading progress of the offline model of the current original network in real time, and the loading progress of the offline model may be indicated by using a data rate, remaining time, or the like.

If the loading progress of the offline model of the current original network is greater than or equal to a first preset percentage, the step of controlling the second processor of the computer equipment to turn on may be performed. Specifically, the first preset percentage may be 80% to 100%. For instance, when the offline model loading unit 1311 finishes loading the offline model of the current original network (e.g., the data loading percentage of the offline model is 100%), then the offline model loading unit 1311 may send a signal indicating the completion of data loading to the equipment management device 1314, so that the equipment management device 1314 may control the second processor 120 to turn on according to the signal indicating the completion of data loading. Or, if the data loading percentage of the offline model loading unit 1311 is greater than or equal to the first preset percentage (e.g., 80%), a signal indicating the completion of loading may be sent to the equipment management device 1314 to turn on the second processor 120 in advance.

Data of the offline model is greater than data of the input data, and the time needed for loading the offline model may be longer than the time needed for loading the input data, thus, a determination of whether to turn on the second processor 120 in advance may be made merely according to the loading progress of the offline model. Further, the input data loading unit 1312 may also be able to obtain the loading progress of input data in real time. If the data loading percentage of the offline model loading unit 1311 is greater than or equal to the first preset percentage (e.g., 80%), and the data loading percentage of the input data loading unit 1312 is greater than or equal to a second preset percentage (e.g., 80%), then the offline model loading unit 1311 and the input data loading unit 1312 may send a signal indicating the completion of data loading to the equipment management device 1314, so that the equipment management device 1314 may control the second processor 120 to turn on according to the received signal indicating the completion of data loading.

In addition, as shown in FIG. 6, an example of the present disclosure further provides a data processing method to be used in the computer equipment shown in FIG. 1, the data processing efficiency and speed of the computer equipment may be further increased by processing heavyweight data such as a neural network through an offline model. Specifically, the method above may include:

S210, calling the offline model API to obtain the corresponding offline model of the current original network, specifically, the application software may call the offline model API provided by the offline model loading unit 1311, so that the offline model loading unit 1311 may be able to read the offline model of the current original network from the memory 130. The corresponding offline model of the current original network may include corresponding model parameters and instructions of the respective computation nodes of the original network as well as interface data of the respective computation nodes of the original network. The generating process of the offline model can be seen in the description in the preceding part.

S220, calling the input data API, and obtaining the input data of the current original network. Specifically, the application software may call the input data API provided by the input data loading unit 1312, so as to obtain input data of the current original network from the memory 130 through the input data loading unit 1312. Further, the application software may call the data preprocessing API provided by the input data preprocessing unit 1313, and preprocess input data obtained by the input data loading unit 1312 through the input data preprocessing unit 1313 so that the second processor 120 may be able to run the input data of the current original network, where the preprocessing including data format conversion, normalization, and the like.

S230, calling the second processor driving API, and controlling the second processor of the computer equipment to turn on. Specifically, the application software may call the second processor driving API provided by the equipment management device 1314, and control the second processor 120 to turn on through the equipment management device 1314.

S240, calling the second processor operation API, and controlling the second processor to obtain output data of the current original network according to the corresponding offline model and input data of the current original network. Specifically, the application software can call the second processor operation API provided by the task execution device 1315, and control the second processor 120 through the task execution device 1315 to obtain the output data of the current original network according to the corresponding offline model and input data of the current original network.

S250, calling the second processor driving API, and controlling the second processor to turn off. Specifically, the application software may call the second processor driving API provided by the equipment management device 1314, and control the second processor 120 to turn off through the equipment management device 1314.

Those of ordinary skill in the art can understand that, all or part of the process of the above-mentioned example method may be realized by a computer program instructing related hardware. The computer program may be stored in a nonvolatile computer readable storage medium. When the computer program is executed, the process of the above-mentioned example method may be included.

Moreover, the example of the present disclosure further provides a computer readable storage medium with a computer program stored in. When the computer program is executed by one or more processors, the computer program may realize the steps mentioned in the method above. The computer storage medium may include a nonvolatile memory and/or a volatile memory. The nonvolatile memory may include ROM (Read Only Memory), PROM (Programmable ROM), EPROM (Electrically PROM), EEPROM (Electrically Erasable PROM), or flash memory. The volatile memory may include RAM (Random Access Memory) or external cache memory. By way of illustration, and rather than limitation, RAM may be obtained in various forms, such as SRAM (Static RAM), DRAM (Dynamic RAM), SDRAM (Synchronous DRAM), DDRSDRAM (Double Data Rate SDRAM), ESDRAM (Enhanced SDRAM), SLDRAM (Synchlink DRAM), RDRAM (Rambus Direct RAM), DRDRAM (Direct Rambus Dynamic RAM), and RDRAM (Rambus Dynamic RAM).

The computer equipment, data processing method and storage medium are capable of directly obtaining the corresponding offline model and input data of a current original network from the memory through the data processing device, so that the second processor of the computer equipment is capable of running the current original network according to the obtained offline model and input data of the current original network, and obtaining output data of the current original network. Since the corresponding offline model of each original network merely includes the corresponding model parameters and instructions of respective computation nodes of the original network as well as the interface data of the respective computation nodes, data of the offline model of the original network is far lighter than data of the original network, so that by running the corresponding offline model of the current original network on a computer equipment, the processing of heavyweight neural network data by the computer equipment may be realized. Meanwhile, by directly running the corresponding offline model of the current original network on the computer equipment, there may be no need to perform processing operations such as compiling on each compute node of the current original network, so that the processing speed and efficiency of the computer equipment may be increased.

Figure 11:
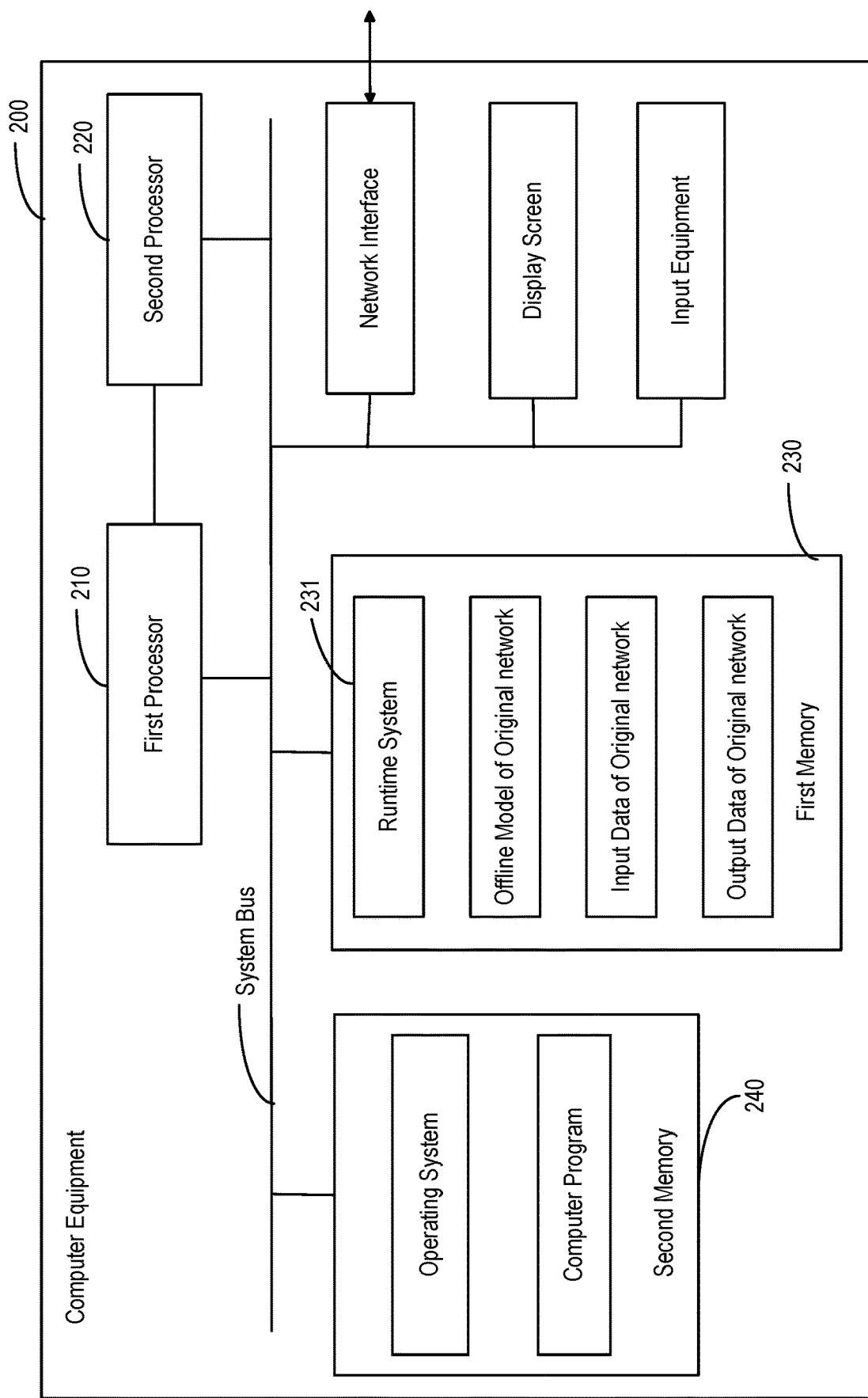
FIG. 11 is a block diagram of computer equipment in another example of the present disclosure.

In other examples of the present disclosure, as shown in FIG. 11, a computer equipment 200 may include a first processor 210, a second processor 220, a first memory 230, and a second memory 240, where the first memory 230 may store corresponding offline models and input data of a plurality of original networks and a runtime system that can run on the first processor 230, and the second memory 240 may store an operating system that can run on the first processor or the second processor. Specifically, the first memory 230 and the second memory 240 may be two memories that are physically independent of each other. Or, the first memory 230 and the second memory 240 may be integrated as one, and the first memory 230 and the second memory 240 may be logically independent of each other.

Further, a count of the first processor 210 may be more than two. For instance, the count of the first processor 210 is two, where one of the first processors 210 may be configured to run the secure runtime system 231, and the other first processor 210 may be configured to run the operating system. Or, the first processor 210 may be a multi-core processor including two or more processing units, where one processing unit may be configured to run the runtime system 231, and another processing unit may be configured to run the operating system. By doing so, the computer equipment may be divided into a secure operating environment and an insecure operating environment through the separation in hardware. Further, the first processor 210 may also be realized by using a secure chip such as TCM, TPM, or TPCM.

The runtime system is a secure runtime system built based on a trusted operating environment, for instance, the runtime system 231 may be a runtime system built on TEE (Trusted Execution Environment). Specifically, TEE can build a runtime system that is separated from insecure software systems such as an operating system, so as to realize software isolation and ensure the security of offline model, input data, and output data of an original network. Further, the secure runtime system 231 may be obtained by using an encryption algorithm, and may also be obtained by using a credibility measurement method. The first memory 230 may be a secure storage medium. When the runtime system 231 is running on the first processor 210, the runtime system 231 may be capable of obtaining the corresponding offline model and input data of the current original network from the first memory 230, and controlling the second processor 220 to run the offline model of the current original network.

It should be understood that, the "secure" mentioned in the example of the present disclosure refers to "trusted", the "secure" may be realized by using a preset encryption algorithm, for instance, a symmetric encryption algorithm, an asymmetric encryption algorithm, or a random encryption algorithm (e.g., using a random password generator to obtain a password). Of course, the "secure" may also be realized by using fingerprint and the like for encryption. Or, the "secure" may also be realized by a credibility measurement method.

Alternatively, the runtime system 231 may be able to provide a secure API (Application Programming Interface) that can be called by the application software, where the API may mainly include key management, cryptographic algorithms, secure memory, and the like. The runtime system 231 may include a data processing device, an equipment management device, and a task execution device, and the structure of the runtime system 231 may be similar to the structure of the above-mentioned runtime system 131 as shown in FIG. 3 and FIG. 4. The data processing device may be able to provide an offline model API and input data API, and may be configured to obtain the corresponding offline model and input data of the current original network from the first memory 230, where the corresponding offline model of the current original network may include the corresponding model parameters and instructions of the respective computation nodes of the original network as well as interface data of respective computation nodes of the original network. The equipment management device may provide a second processor driving API configured to control the second processor 220 to turn on or turn off. The task execution device may provide a second processor operation API configured to control the second processor 220 to run the offline model and input data of the current original network.

Further, the data processing device may include an offline model loading unit and an input data loading unit. The offline model loading unit may provide an offline API configured to obtain the corresponding offline model of each of the current original networks from the first memory 230, and analyze the offline models of the current original networks. The input data loading unit may provide an input data API configured to obtain the corresponding input data of the current original network from the first memory 230.

Further, the data processing device may include an input data preprocessing unit, the input data preprocessing unit may provide a data preprocessing API configured to preprocess input data obtained by input data loading unit, cause the second processor 220 to be capable of running the input data of the current original network, and store output data obtained by the second processor 220 in the first memory 230.

Alternatively, a count of the second processor 220 may be plural, or the second processor 220 may include a plurality of processing units; the task execution device may further be capable of providing a task distribution API configured to control the plurality of the second processors 220, or control the plurality of processing units of the second processor 220.

Further, the computer equipment may also include a TA (Trusted Application) software that can run on the runtime system 231, and the application software may be capable of calling the offline model API, the input data API, the second processor driving API, and the second processor operation API. The TA software may be realized by using an encryption algorithm, and may also be realized by using a credibility measurement method.

It should be understood that, working principles of the data processing device, the equipment management device, and the task execution device of the example of the present disclosure may be basically similar to the working principles of each of the devices mentioned in the examples above, and the details can be seen in the description in the preceding part.

Referring to FIG. 12, the present disclosure further provides a data processing method to be used in the computer equipment shown in FIG. 11. The method may include:

S310, obtaining corresponding offline model and input data of a current original network from the first memory, where the corresponding offline model of the current original network may include corresponding model parameters and instructions of respective computation nodes of the original network as well as interface data of the respective computation nodes of the original network. Specifically, when the first processor runs the secure runtime system 231, the secure runtime system 231 may obtain the corresponding offline model and input data of the current original network from the secure first memory 230. Alternatively, when the first processor 210 runs the runtime system 231, the first processor 210 may read the corresponding offline model and input data of the current original network from the first memory 230 through the data processing device of the runtime system 231. Further, the corresponding offline model of the current original network may be obtained from the first memory 230 through the offline model loading unit of the data processing device. The input data may be obtained from the first memory 230 through the input data loading unit, where the input data may be corresponding input data of initial computation nodes of the original network.

S320, controlling the second processor of the computer equipment to turn on. Specifically, the secure runtime system 231 may control the second processor 220 of the computer equipment to turn on. Alternatively, the equipment management device of the runtime system 231 may control the second processor to turn on or turn off. When the offline model loading unit finishes loading the offline model of the current original network, then the offline model loading unit may send a signal indicating the completion of data loading to the equipment management device, so that the equipment management device may control the second processor 220 to turn on according to the received signal indicating the completion of data loading.

S330, controlling the second processor of the computer equipment to run the current original network according to the corresponding offline model and input data of the current original network, and obtaining output data of the current original network. Specifically, the runtime system 231 may control the second processor 220 of the computer equipment to run the offline model and the corresponding input data to obtain the output data of the current original network. Alternatively, the second processor 220 may be controlled to run the offline model of the current original network through the task execution device of the runtime system 231.

It should be understood that running the corresponding offline model of the current original network refers to using the offline model to run a corresponding machine learning algorithm (e.g., neural network algorithm) of the original network, and realize a target application (e.g., artificial intelligence applications such as speech recognition) by performing a forward operation.

S340, storing the output data of the current original network in the first memory. In other words, the runtime system 231 may store the output data of the current original network in the secure first memory 230. Alternatively, the output data of the current original network may be stored in the first memory 230 through the data processing device of the runtime system 231. Further, the data processing device can preprocess the output data of the original network, where the preprocessing may include data format conversion. Then, the data processing device may store the output data in the first memory 230. Still further, the input data preprocessing unit of the data processing device can preprocess the output data of the original network, where the preprocessing may include data format conversion. Then, the data processing device may store the output data in the first memory 230.

Referring to FIG. 13, the present disclosure further provides a data processing method to be used in the computer equipment shown in FIG. 11. The method may include:

S410, calling the offline model API, and obtaining the corresponding offline model of the current original network from the first memory. Specifically, the TA software may call the offline model API to cause the offline model loading unit to read the corresponding offline model of the current original network from the first memory 230. The corresponding offline model of the current original network may include corresponding model parameters and instructions of the respective computation nodes of the original network as well as interface data of the respective computation nodes of the original network.

S420, calling the input data API, and obtaining the input data of the current original network; specifically, the TA software may call the input data API to obtain the input data of the current original network from the first memory 230 through the input data loading unit.

S430, calling the second processor driving API, and controlling the second processor of the computer equipment to turn on, specifically, the TA software may call the second processor driving API and control the second processor to turn on through the equipment management device.

S440, calling the second processor operation API, and controlling the second processor to obtain output data of the current original network according to the corresponding offline model and input data of the current original network. Specifically, the TA software can call the second processor operation API, so as to control the second processor 220 through the task execution device to obtain the output data of the current original network according to the corresponding offline model and input data of the current original network.

S450, calling the second processor driving API, and controlling the second processor to turn off. Specifically, the TA software may call the second processor driving API, so as to control the second processor 220 to turn off through the equipment management device.

Further, the method above may also include:

calling the data preprocessing API, and storing the output data of the current original network in the first memory. Specifically, the TA software may call the data preprocessing API provided by the runtime system 231, so as to preprocess (e.g., data format conversion and normalization) the output data through the input data preprocessing unit of the data processing device, and store the output data of the current original network in the first memory 230.

Further, after the calling the input data API, and obtaining the input data of the current original network, the method may further include:

calling the data preprocessing APL and preprocessing the obtained input data of the current original network so that the second processor can run the input data. Specifically, the TA software may call the data preprocessing API provided by the input data preprocessing unit, and preprocess (e.g., data format conversion and normalization) the input data through the input data preprocessing unit to cause the second processor 220 to be able to run the input data of the current original network.

Alternatively, the example of the present disclosure may further include an offline model generating process. The offline model generating process can run on a cloud server or a dedicated neural network processor, and store an obtained offline model of an original network in the first memory 230. The cloud server or the dedicated neural network processor may be a processor that can process heavyweight data such as a neural network. The cloud server or the dedicated neural network processor may not be included in the above-mentioned computer equipment. The detailed generating process of the offline model can be seen the description in the preceding part.

Those of ordinary skill in the art can understand that, all or part of the process of the above-mentioned example method may be realized by a computer program instructing related hardware. The computer program may be stored in a nonvolatile computer readable storage medium. When the computer program is executed, the process of the above-mentioned example method may be included.

Moreover, the example of the present disclosure further provides a computer readable storage medium with a computer program stored in. When the computer program is executed by one or more processors, the computer program may realize the steps mentioned in the method above. The computer storage medium may include a nonvolatile memory and/or a volatile memory. The nonvolatile memory may include ROM (Read Only Memory), PROM (Programmable ROM), EPROM (Electrically PROM), EEPROM (Electrically Erasable PROM), or flash memory. The volatile memory may include RAM (Random Access Memory) or external cache memory. By way of illustration, and rather than limitation, RAM may be obtained in various forms, such as SRAM (Static RAM), DRAM (Dynamic RAM), SDRAM (Synchronous DRAM), DDRSDRAM (Double Data Rate SDRAM), ESDRAM (Enhanced SDRAM), SLDRAM (Synchlink DRAM), RDRAM (Rambus Direct RAM), DRDRAM (Direct Rambus Dynamic RAM), and RDRAM (Rambus Dynamic RAM).

In the example of the present disclosure, the offline model of the current original network may merely store necessary network structure information such as corresponding model parameters and instructions of the respective compute node of the original network, as well as interface data of the respective computation nodes of the original network. Thus, data of the offline model of the original network may be far lighter than data of the current original network, so that by running the offline model of the current original network, the processing of heavyweight data such as a neural network based on a secure runtime system built in a trusted execution environment such as TEE can be realized, and the application scope of a neural network can be expanded. Meanwhile, by directly running the corresponding offline model of the current original network on the computer equipment, there is no need to perform processing operation such as compiling on each compute node of the current original network, so that the processing speed and efficiency of the computer equipment may be increased.

Although the examples above only show several implementation modes of the disclosure, and the description of the examples is relatively specific and detailed, they are not to be considered as limitation of the scope of the present disclosure. It should be noted that, those of ordinary skill in the art can make various changes and improvements which shall fall within the protection scope of the present disclosure. Therefore, the protection scope of the present disclosure is subject to the protection scope in the claims.

The invention claimed is:

1. A computer system, comprising:
   first and second processors; and
   a memory storing offline models and corresponding input data of a plurality of original networks, and a runtime system configured to run on the first processor, wherein the runtime system, when runs on the first processor, causes the first processor to implement a plurality of virtual devices comprising:
   a data processing device configured to obtain an offline model and corresponding input data of an original network from the memory, wherein the offline model of the original network comprises model parameters, instructions, and interface data of respective computation nodes of the original network, wherein the instructions of respective computation nodes of the original network are required after compiling the original network;
   an equipment management device configured to control turning on or off of the second processor; and
   a task execution device configured to control the second processor to run the offline model of the original network directly without compiling the original network based on at least the instructions of respective computation nodes of the original network.

2. The computer system of claim 1, wherein the data processing device comprises:
   an offline model loading unit configured to obtain and analyze the offline model of the original network, and
   an input data loading unit configured to obtain the input data corresponding to the offline model of the original network from the memory.

3. The computer system of claim 2, wherein the data processing device comprises an input data preprocessing unit configured to:
   preprocess the input data obtained by the input data loading unit to allow the second processor to process the input data; and
   store output data output by the second processor in the memory.

4. The computer system of claim 1, wherein:
   the memory stores an application configured to run on the runtime system;
   the data processing device is configured to provide an offline model Application Programming Interface (API) and an input data API;
   the equipment management device is configured to provide a second processor driving API;
   the task execution device is configured to provide a second processor operation API; and
   the application is configured to call at least one of the offline model API, the input data API, the second processor driving API, or the second processor operation API.

5. The computer system of claim 4, wherein:
   the second processor comprises a plurality of processors or processing units;
   the task execution device is configured to provide a task distribution API; and
   the application is configured to call the task distribution API to control the plurality of processors or processing units of the second processor.

6. The computer system of claim 1, wherein the runtime system is a secure runtime system built on a trusted operating environment.

7. A data processing method, implemented by first and second processors, the data processing method comprising:
obtaining, by the first processor, an offline model and corresponding input data of an original network from a memory, wherein the offline model of the original network comprises model parameters, instructions, and interface data of respective computation nodes of the original network, wherein the instructions of respective computation nodes of the original network are required after compiling the original network;
controlling, by the first processor, the second processor to turn on or off;
running, on the second processor, the original network directly without compiling the original network based on at least the instructions of respective computation nodes of the offline model and the corresponding input data of the original network obtained by the first processor to obtain output data of the original network; and
storing the output data of the original network in the memory.

8. The data processing method of claim 7, further comprising:
obtaining loading progress of the offline model of the original network in real time; and
when the loading progress is greater than or equal to a first preset threshold, turning on the second processor.

9. The data processing method of claim 7, wherein prior to obtaining the offline model and the corresponding input data of the original network from the memory, the method comprises:
analyzing and preprocessing the offline model of the original network; and
preprocessing the input data corresponding to the offline model of the original network.

10. The data processing method of claim 7, comprising:
calling an offline model API to obtain the offline model of the original network;
calling an input data API to obtain the input data corresponding to the offline model of the original network;
calling a second processor driving API to turn on the second processor;
calling a second processor operation API to control the second processor to obtain the output data of the original network; and
calling the second processor driving API to turn off the second processor.

11. A non-transitory computer-readable storage medium storing a computer program, wherein the computer program, when executed by one or more processors, causes the one or more processors to perform operations comprising:
obtaining, by a first processor, an offline model and corresponding input data of an original network from a memory, wherein the offline model of the original network comprises model parameters, instructions, and interface data of respective computation nodes of the original network, wherein the instructions of respective computation nodes of the original network are required after compiling the original network;
controlling, by the first processor, a second processor to turn on or off;
controlling the second processor to run the original network directly without compiling the original network based on at least the instructions of respective computation nodes of the offline model and the corresponding input data of the original network obtained by the first processor to obtain output data of the original network; and
storing the output data of the original network in the memory.

12. The non-transitory computer-readable storage medium of claim 11, wherein prior to obtaining the offline model and the corresponding input data of the original network from the memory, the operations comprise:
analyzing and preprocessing the offline model of the original network; and
preprocessing the input data corresponding to the offline model of the original network.

13. The non-transitory computer-readable storage medium of claim 11, wherein the operations comprise:
calling an offline model API to obtain the offline model of the original network;
calling an input data API to obtain the input data corresponding to the offline model of the original network;
calling a second processor driving API to turn on the second processor;
calling a second processor operation API to control the second processor to obtain the output data of the original network; and
calling the second processor driving API to turn off the second processor.

* * * * *